(12) United States Patent
Belansky et al.

(10) Patent No.: US 8,917,996 B2
(45) Date of Patent: Dec. 23, 2014

(54) SIMPLIFIED SERIAL DATA OVER OPTICAL FIBER FOR REMOTE RECEIVER/SENSOR APPLICATIONS

(75) Inventors: Richard H. Belansky, Yorba Linda, CA (US); Harold A. Pratt, Los Angeles, CA (US); Cecil Vergel De Dios, Torrance, CA (US); Richard P. Hsia, Torrance, CA (US)

(73) Assignee: Raytheon Company, Waltham, MA (US)

(*) Notice: Subject to any disclaimer, the term of this patent is extended or adjusted under 35 U.S.C. 154(b) by 223 days.

(21) Appl. No.: 13/495,514

(22) Filed: Jun. 13, 2012

(65) Prior Publication Data

US 2013/0336656 A1 Dec. 19, 2013

(51) Int. Cl.
*H04B 10/12* (2006.01)

(52) U.S. Cl.
USPC ........... 398/141; 398/140; 398/154; 398/171; 398/79; 398/116

(58) Field of Classification Search
CPC .............. H04B 10/2503–10/299; H04B 10/30; H04B 10/80–10/808; H04B 10/85; H04J 14/02–14/0204
See application file for complete search history.

(56) References Cited

U.S. PATENT DOCUMENTS

| | | | |
|---|---|---|---|
| 5,539,846 A * | 7/1996 | Morikura et al. | 385/24 |
| 6,433,906 B1 * | 8/2002 | Farhan | 398/167.5 |
| 6,462,851 B1 * | 10/2002 | West, Jr. | 398/141 |
| 7,103,377 B2 | 9/2006 | Bauman et al. | |
| 7,668,153 B2 | 2/2010 | Zavadsky | |
| 2003/0034963 A1 * | 2/2003 | Moon et al. | 345/204 |
| 2006/0093376 A1 * | 5/2006 | Mitchell et al. | 398/183 |
| 2007/0238457 A1 * | 10/2007 | Wala | 455/424 |
| 2008/0235418 A1 * | 9/2008 | Werthen et al. | 710/106 |
| 2010/0061291 A1 | 3/2010 | Wala | |
| 2010/0208777 A1 | 8/2010 | Ogaz | |
| 2011/0026932 A1 * | 2/2011 | Yeh et al. | 398/116 |

OTHER PUBLICATIONS

Mayott: "Understand the new JESD204 standard for single-transmission-pair, serial communication from your analog/digital converter", http://wwwbedded.com/print/4010055, Jun. 12, 2008, pp. 1-5.*
Maury Wood et al: "Merit of JESD204B for medical imaging systems", http://www.nxp.com/documents/other/R_10017.pdf, Oct. 27, 2011, pp. 1-9.*
Goutzoulis et al: "Development and Antenna Range Demonstration of an Eight-Element Optically Powered Directly Modulated Receiver UHF Fiberoptic Manifold", Journal of Lightwave Technology, vol. 14, No. 11, Nov. 1996, pp. 2499-2505.*

(Continued)

*Primary Examiner* — Li Liu
(74) *Attorney, Agent, or Firm* — Daly, Crowley, Mofford & Durkee, LLP

(57) ABSTRACT

Embodiments of the concepts, systems, and techniques disclosed herein are directed to an optically powered, direct-sampling, analog-to-digital converter (ADC) that provides fully formatted, serialized data for transmission over optical fiber from a remote location. Such a system and method of use thereof requires less electrical power, fewer components, and less complexity than previous systems and methods and achieves an all-optical-fiber implementation that provides complete electrical and electromagnetic interference (EMI) isolation for the remote ADC. These concepts, systems, and techniques simplify the overall remote sensing architecture by locating the ADC near the sensor and transferring pure digitized signals back to the processor.

16 Claims, 5 Drawing Sheets

(56) References Cited

OTHER PUBLICATIONS

Edward Kohler: "JESD204B serial interface spec outperforms parallel formats", http://www.planetanalog.com/document.asp?doc_id=528360; Oct. 2, 2012.*

Belansky et al.; "Simplified Serial Data Over Optical Fiber Concept for Remote Receiver/Sensor Applications;" Raytheon Company; Slide Presentation dated Jan. 17, 2012; 23 pages.

Eumurian et al.; "Optically Controlled Remote Modulator;" Proceedings of the 4$^{th}$ Annual ARPA Symposium on Photonics Systems for Antenna Applications; Jan. 1994; pp. 352-357.

Gamage et al.; "Experimental Demonstration of Digitized RF Transport over Optical Fiber Links;" International Topical Meeting on Microwave Photonics; Gold Coast, Queensland, Australia; Sep. 2008; pp. 15-18.

Groutzoulis et al.; "Development and Antenna Range Demonstration of a Eight-Element Optically Powered Directly Modulated Receive UHF Fiberoptic Manifold;" Journal of Lightwave Technology, vol. 14, No. 11; Nov. 1996; pp. 2499-2505.

Heikkinen et al.; "High-Speed ADC and DAC Modules with Fibre Optic Interconnections for Telecom Satellites;" 7$^{th}$ International Conference on Space Optics; Toulouse, France; Oct. 2008; pp. 1-9.

Thomas et al.; "Fully Powered-over-Fibre Remote Antenna Unit;" International Topical Meeting on Microwave Photonics; Gold Coast, Queensland, Australia; Sep. 2008; pp. 102-105.

Wake et al.; "An Optically Powered Radio over Fiber Remote Unit using Wavelength Division Multiplexing;" International Topical Meeting on Microwave Photonics; Gold Coast, Queensland, Australia; Sep. 2008; pp. 197-200.

* cited by examiner

SIMPLIFIED SERIAL DATA OVER OPTICAL FIBER FOR REMOTE RECEIVER/SENSOR APPLICATIONS

GOVERNMENT LICENSE RIGHTS

This invention was made with government support under a contract awarded by a department or agency of the United States government agency. The government has certain rights in the invention.

BACKGROUND

A typical remote sensing system includes, among other things, optical fibers configured to convey the sensed data back to a central processor. Typical remote sensor locations suffer from both limited available electrical power and physical space. One conventional approach to providing the necessary electrical and electromagnetic interference (EMI) isolation between the remote sensors and the processor is to use an analog photonic link over optical fibers from the sensor or sensors to analog-to-digital converters (ADCs) located in proximity to the central (digital) processor. Another approach is to locate the ADCs in close proximity to the remote sensor(s) and send digitized data over the optical fibers. However, the power and space constraints at the remote location have proved difficult to overcome. Remotely locating ADCs over optical fiber at locations having both limited available electrical power and physical space has presented a particularly significant challenge.

Such remote sensing systems may be used for scientific data collection, geophysical measurements, hazardous environment testing, covert sensing, and similar missions. One typical application is collection of neutrino scintillation measurements from deep ice boreholes and oil prospecting.

Transmitting digitized data from remote ADCs over optical fiber has been achieved previously with implementations that require relatively high power and circuit complexity. Standard configurations use ADC devices having several output lines (e.g., N-bit parallel data lines or multiple serial lines with framing and clock signal lines) and require additional components to configure the ADC data before transmission. Previous techniques to properly format the ADC data for transmission over optical fiber data links have required high power consumption field programmable gate array (FPGA) or serializer devices. In addition, separate clock multiplication circuitry requiring significant power and space has been used to provide the necessary reference clock signals to the data serializer and multiplexer components. The power consumption of these previous configurations has often exceeded the available electrical power provided using conventional power-by-light (PBL) technologies and prevents an all optical fiber implementation of a remote ADC.

FIG. 1 depicts a high-level block diagram of a portion of a prior art remote sensor system 100 that employs an optical link. Here, remote front end module 110 consists of one or more sensors 120 and amplifiers 125 (one each shown for clarity). The amplified, analog data (typically wideband) is processed by photonic link 130 (such as by upconversion and modulation, for example) and transmitted over optical fiber 140 to base station receiver module 150. The analog data is detected and converted back to baseband by photodetector 160 and baseband components 170. Finally, the analog data is digitized in analog to digital converter (ADC) 180 and passed to processor 190 for processing. Various means for processing the wideband sensor data into forms suitable for analog transmission over optical fiber 140 are well known in the art.

Another prior art system for remote sensing (not shown) employs a conventional 14-bit parallel output ADC in the remote front end module instead of a photonic link. This system has a minimum of 15 data/signal output lines between the remote front end module and the base station receiver. It also requires additional components for correcting the serial format (such as an FPGA or serializer). Consequently, such a system suffers from high power consumption and complex packaging and integration issues.

Yet another prior art scheme uses a conventional 14-bit serial output ADC and a minimum of three data/signal output lines instead of an analog photonic link; the three data/signal outputs may be transmitted electrically or photonically to a base station. However, it still requires additional components for correcting the serial format (such as a serializer or other devices for framing and/or multiplexing). Such prior art systems also suffer from high power consumption and complex packaging and integration issues.

Thus, while prior art systems and techniques provide a desired level of electromagnetic interference (EMI) isolation, the prior art systems and techniques suffer from several disadvantages. In general, prior art systems and techniques are power-hungry and space-inefficient in the remote front end module due to the complexities of photonic link circuitry and numerous other circuit components.

What is needed is a complete EMI isolation solution that reduces or even minimizes the amount of space and power required in a remote front end while simplifying the overall architecture for remote sensing applications by locating the ADC near the sensor. Furthermore, it is desirable to eliminate analog photonic links and the related performance and maintenance problems caused by optical connectors carrying analog signals.

SUMMARY

In contrast to the above-described conventional approaches, embodiments of the concepts, systems, and techniques disclosed herein are directed to an optically powered, direct-sampling, analog-to-digital converter (ADC) that provides fully formatted, serialized data for transmission over optical fiber from a remote location. This approach results in a system and method that requires less electrical power, fewer components, and less complexity than previous systems and methods and achieves an all-optical-fiber implementation that provides complete electrical and electromagnetic interference (EMI) isolation for the remote ADC. Such a solution also simplifies the overall remote sensing architecture by locating the ADC near the sensor and transferring pure digitized signals back to the processor.

Embodiment of the present concepts, systems, and techniques employ commercial off-the-shelf (COTS) components to implement a simplified remote direct-sampling, ADC via an all optical fiber interface. The optical fiber interface may consist, in one exemplary embodiment, of only three individual fibers providing electrical power, sampling clock/synchronization signal, and serial ADC data, respectively.

Systems constructed in accordance with these concepts may leverage the Joint Electron Devices Engineering Council (JEDEC) serial interface standard JESD204 in any of its forms and revisions now known or to be promulgated in the future. This industry interface standard, originally developed for the interconnection of data converters to field programmable gate array (FPGA) devices on printed circuit (PC) boards, requires only two signal traces (i.e., a single differential data lane). The JESD204 standard allows for multiple aligned serial data lanes for multiple ADC devices, thus enabling for the scaling to multiple channel applications, each channel having a single ADC. The presently-described remote ADC system takes advantage of existing ADC and JESD204-compliant interface technologies that incorporate the serial interface standard in low electrical power consumption devices.

In contrast to previously-known applications for JESD204-compliant ADC devices, the present system provides an interconnection between the ADC and the FPGA over a relatively long fiber optic link. Such a photonic link may transmit the serialized ADC data over a single optical fiber with a path length that exceeds (in at least some instances far exceeds) the original one meter physical distance limit specified by the JESD204 standard. Since the JESD204 interface incorporates an 8B/10B coding scheme, data framing, clock recovery, and error detection, digital photonic links constructed according to the present concepts, systems, and techniques only need to be a high speed passive link, i.e., a simple light pipe. Such passive links do not require the protocol overhead or network-specific devices common to digital fiber networking applications based on other typical networking schemes such as Gigabit Ethernet and Fiber Channel. In addition, the JESD204 embedded clock and data recovery (CDR) eliminates the need for clock multiplication circuitry to generate the required clock synchronization for a separate serializer chip.

In some exemplary embodiments, the resulting photonic link may employ a high speed photonic driver and receiver chip set to support the required transmission rate set by the ADC sampling clock. In addition, using low power consumption devices that combine both the ADC and the JESD204 serial interface in a single package and a simple laser diode or vertical cavity surface emitting laser (VCSEL) driver chip may further enable the use of power-by-light techniques to provide electrical power for the remotely sensor and ADC.

The ADC sampling clock and the JESD204 synchronization (sync) signal from the FPGA may be combined and distributed to the remote ADC via an optical fiber using, in some embodiments, an optical wavelength division multiplexing (WDM) analog photonic link. In a typical WDM link, two different optical laser wavelengths may be optically multiplexed onto a single fiber and amplified using an erbium doped fiber amplifier (EDFA). Each laser wavelength may then be employed as a separate optical carrier that is intensity modulated (using either direct or external modulation techniques) before multiplexing with the respective sampling clock and ADC sync signal.

By utilizing analog-to-digital converters with the JESD204 serial interface one can, for the first time, implement an entire long distance remote sensor system connected entirely by photonic links. In some embodiments, electrical power may be delivered to the remote sensor ADC using power-by-light technology. In some embodiments, optical wavelength division multiplexing may be used to provide the ADC sampling clock, synchronization, and control signals. The sampled data from the serial output ADC may them be transmitted over optical fiber and thus routed to a distant, centralized processor for collection and analysis.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the present invention are directed to systems, apparatus, and techniques for providing an optically powered, direct-sampling, analog-to-digital converter (ADC) outputting fully formatted, serialized data for transmission over one or more optical fibers from a remote location. This approach requires lower electrical power, fewer components and less complexity than previous methods and achieves an all optical fiber implementation that provides complete electrical and electromagnetic interference (EMI) isolation for the remote ADC. Such a solution also simplifies the overall remote sensing architecture by locating the ADC near the sensor and transferring pure digital signals back to the processor.

Figure 2:
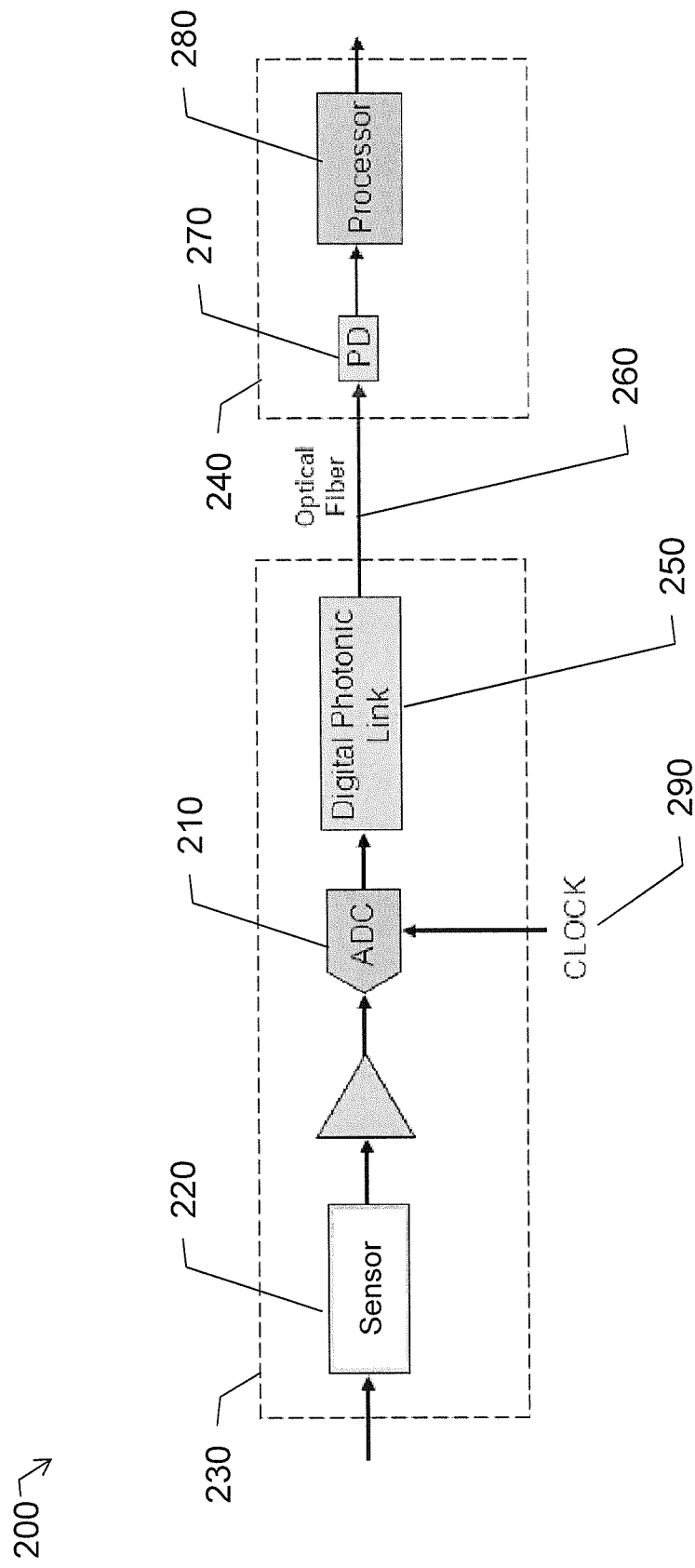
FIG. 2 is a simplified block diagram of a portion of a remote sensor system with a digital photonic link, according to one embodiment of the present invention.

FIG. 2 is a simplified block diagram of an apparatus 200 for communicating with a remote sensor, according to one embodiment of the concepts, systems, and techniques disclosed herein. Apparatus 200 includes a remote sensor 220, which provides an analog sensor signal to an input of an amplifier 221. In turn, amplifier 221 provides an appropriately amplified version of the sensor signal to an input of analog-to-digital converter (ADC) 210. ADC 210 converts the analog signal provided thereto to a digital signal and provides a stream of digital bits to an input of a digital photonic link 250.

This system architecture and approach places the ADC 210 in close proximity to sensor 220 housed in a remote receiver 230 (so referred to herein because it is the system element that "receives" the sensed data) with the receiver 230 (and hence sensor 220) remotely located from a base station processor 240. The digitized data output of ADC 210 is transmitted or otherwise transferred or provided to base station processor 240 via a digital photonic link 250 and optical connection 260.

Figure 1:
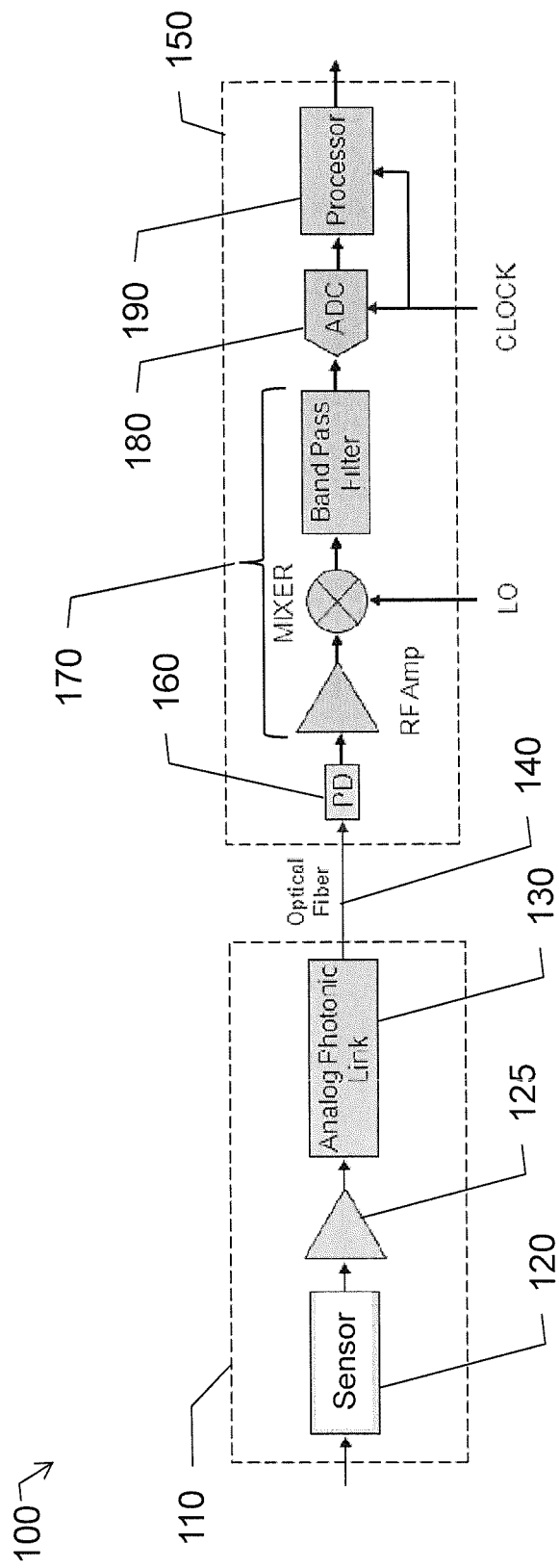
FIG. 1 is a simplified block diagram of a portion of a prior art remote sensor system.

Direct sampling of sensed parameters at the location of remote sensor 220 eliminates the need for an RF down-converter and other analog devices (see, e.g., FIG. 1, discussed above) that would normally be used to transmit high bandwidth sensed data to processor 240.

The serial digitized data is received from optical connection 260 at base station processor 240. Photodetector (or other conventional optical fiber receiver/terminator) 270 demodulates the optical signal and recovers the serial data embedded therein. The data is then passed through conventional means to processor 280 for further processing according to the needs and requirements of the remote sensing system.

In one exemplary embodiment, digital photonic link 250, optical connection 260, and photodetector (or, generically, optical fiber receiver/terminator) 270 may jointly employ a serial data link based on the well-known Joint Electron Devices Engineering Council (JEDEC) serial interface standard JESD204 in any of its revisions now known or to be promulgated in the future, such as but not limited to JESD204, 204A, or 204B. Future revisions to the standard, to the extent they supply the basic functionality described herein, may also be compatible with and/or usable by the systems and techniques described herein. The JESD204 standard is incorporated herein by reference in its entirety.

The JESD204 industry interface standard, originally developed for the interconnection of analog-to-digital data converters to field programmable gate array (FPGA) devices on printed circuit (PC) boards, conventionally requires two (analog) signal traces (i.e., a single differential data lane). The JESD204B standard allows for multiple aligned serial data lanes for multiple ADC devices, thus enabling scaling to multichannel applications.

Embodiments of the presently-described remote ADC system takes advantage of existing ADC technologies that incorporate this serial interface standard in low electrical power consumption devices. In such systems, a portion of the serial interface circuitry may be included in the ADC package. However, because systems constructed to comply with the basic JESD204 standard have a single low-voltage differential signaling (LVDS) ADC data output and low power consumption, typical non-optical systems constructed in compliance with the standard are limited to a maximum of approximately 1 meter separation between the ADC and the processing FPGA.

In contrast to the original intended application for JESD204-compliant serial interfaces, the present system provides an interconnection between the ADC and the processor over a relatively long digital fiber optic link. Such a photonic link may transmit the serialized ADC data over a single optical fiber with a path length that far exceeds the original one meter physical distance limit specified by the JESD204 standard. Since the JESD204 interface incorporates an 8B/10B coding scheme, data framing, clock recovery (based on the ADC sampling rate), and error detection, digital photonic links constructed according to the present concepts, systems, and techniques only need to be a high-speed passive link. Thus, they do not require the protocols or network-specific devices common to fiber networking applications based on other typical networking schemes such as Gigabit Ethernet and Fiber Channel. In addition, the JESD204 embedded clock and data recovery features eliminate the need for clock multiplication circuitry to generate the required clock synchronization for a separate serializer chip.

In some embodiments, embedded clock signals may be recovered from the serial digitized data stream by photodetector 270. Alternatively, the embedded clock signals may be recovered in processor 280. One of ordinary skill in the art will appreciate that many arrangements for clock and data recovery from an optical link are possible; the present disclosure is not limited to any particular method, but encompasses all such schemes known in the art.

Figure 3:
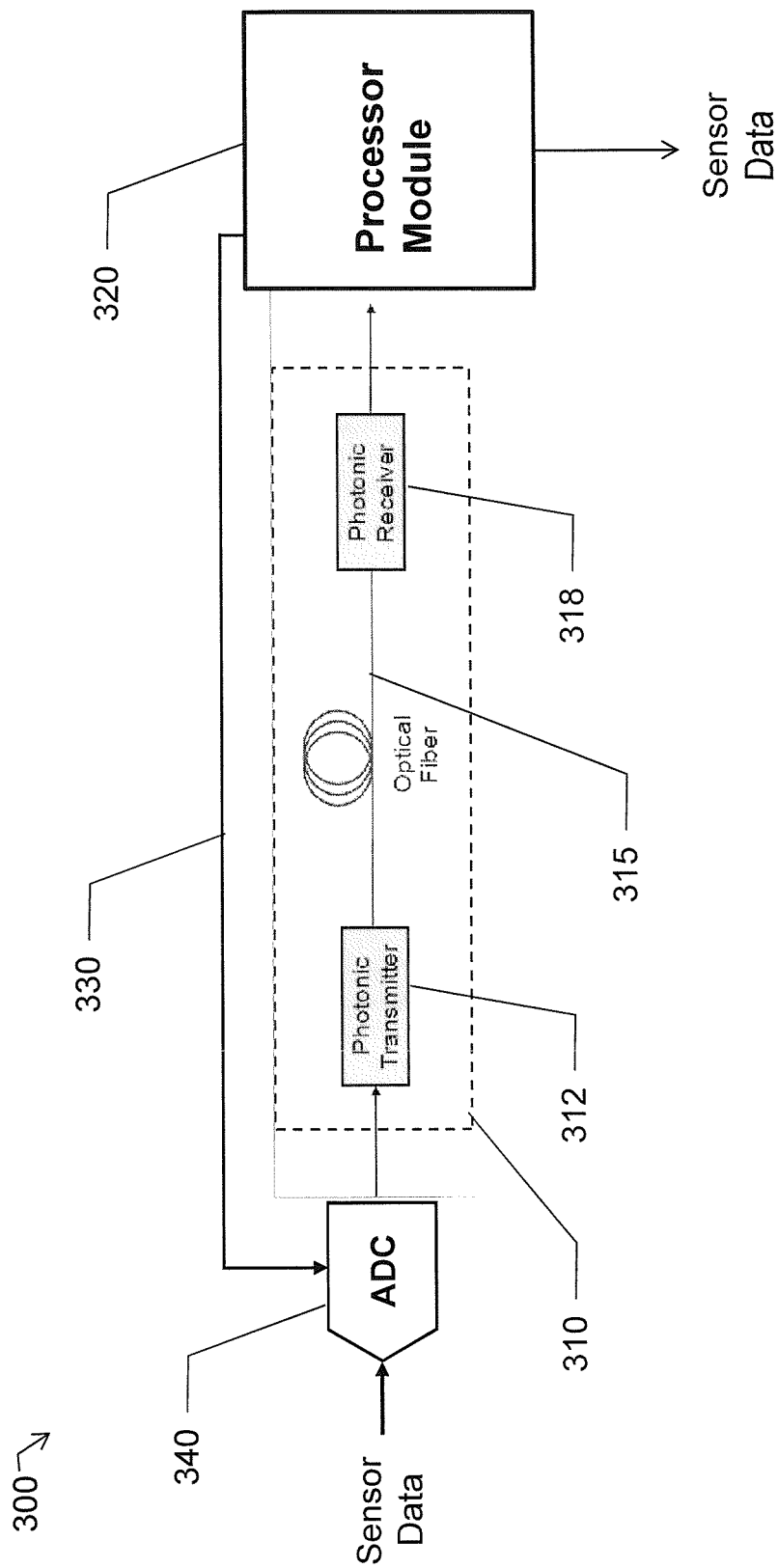
FIG. 3 is a simplified block diagram of a portion of a digital photonic link implemented according to one embodiment of the present invention.

FIG. 3 illustrates a portion of a JESD204-compliant serial interface 300 employing a photonic link instead of an electrical data lane, according to one embodiment of the concepts, systems, and techniques disclosed herein. Digital photonic link 310 (including photonic transmitter 312, optical connection 315, and photonic receiver 318) extends the distance between the remotely-located JESD204 transmitter circuitry (co-located, in one exemplary embodiment, with ADC 340) and the JESD204 receiver/processor circuitry. In some embodiments, processor module 320 only provides the receiver functions of the JESD204 standard interface (for example, but not by way of limitation, clock and data recovery and synchronization) and passes on the sensor data for further processing by other devices.

While FIG. 3 represents the JESD204 receiver/processor circuitry in generic form as processor module 320, one of ordinary skill in the art will appreciate that such receiver/processor circuitry may be implemented in many forms. In particular, since the JESD204 receiver/processor circuitry is based on a widely-used industry standard, numerous implementations are available, including but not limited to IP cores for Xilinx VIRTEX JESD204-compliant FPGA products, available from Xilinx Inc., of San Jose, Calif. (XILINX and VERTEX are trademarks of the Xilinx, Inc.) Accordingly, although particular embodiments and implementations of the functions of the JESD204-compliant interface are described and located in certain elements of the systems described herein, those skilled in the art will realize that other locations and/or functional partitions may be used. Accordingly, the concepts, systems, and techniques described herein are not limited to any particular partitioning or location of the elements of the JESD204-compliant interface.

The low voltage data signal (LVDS) output of ADC 210 may be converted by the JESD204 transmitter circuitry (not shown in FIG. 3, but may form a part of ADC 210 or, in some embodiments, may be implemented in a separate device) into conventional signals suitable for input to an industry-standard photonic transmitter 312. The signals then travel over optical fiber connection 315 to corresponding photonic receiver 318 and may be converted back to standard LVDS levels for processing by JESD204 receiver circuitry in processor 320 as described above.

Advantageously, the high speed passive optical data link enabled by the JESD204 standard and the use of conventional, industry-standard photonics supports very high data rates and does not require additional formatting circuitry—the JESD204 transmitter takes care of all necessary formatting. Furthermore, this implementation avoids adding link complexity because it does not use any network-specific protocols or overhead to transmit the serial data.

In some exemplary embodiments, the resulting digital photonic link 310 may employ a high-speed photonic driver and receiver chip set (in transmitter 312 and receiver 318) to support the required transmission rate set by the ADC sampling clock. In a further alternate embodiment, a low power consumption device that combine both the ADC and the JESD204 serial interface in a single package may be used. Such devices are readily designed by one of ordinary skill in the art of custom and semi-custom integrated circuit design by combining the well-known functionality of off-the-shelf ADC designs with pre-defined, JESD204 standard transmitter IP cores.

In a further alternate embodiment, the use of a simple laser diode or vertical cavity surface emitting laser (VCSEL) for photonic transmitter 312, in combination with the low power combined ADC/JESD204 transmitter described above, can reduce the power requirements of the remote receiver to the point that power-by-light (PBL) techniques may be advantageously employed. In a PBL implementation, the operating power needed to run the active components at the remote receiver is provided by an optical source over a fiber optic link. A photovoltaic cell in the remote receiver converts the optical energy back to direct current, thus providing electrical power for the remote receiver.

Processor 320 (in particular, the JESD204 receiver circuitry embedded in or forming a part thereof) also supplies a JESD204 synchronization signal 330 to the remotely-located ADC, in accordance with the JESD204 standard. Sync signal 330 may, in some embodiments, be provided on a separate optical fiber. Alternatively, sync signal 330 may be carried on optical fiber 315, with photonic transmitter 312 and photonic receiver 318 replaced by conventional photonic transceivers (not shown). Thus, as will be discussed further below, although FIG. 3 depicts optical connection 315 as separate from sync signal 330, one of ordinary skill in the art will appreciate that optical connection 315 may be comprised of multiple fibers, including both uni-directional and bi-directional links. Accordingly, the concepts, systems, and techniques presently disclosed are not limited as to the nature and number of optical fibers in optical connection 315.

As in most analog-to-digital conversion applications, ADC 210 also requires a sampling clock signal 290 (referring to FIG. 2). Sampling clock signal 290 may be provided on a separate optical fiber connection between remote receiver 230 and processor 240 (not shown).

Figure 4:
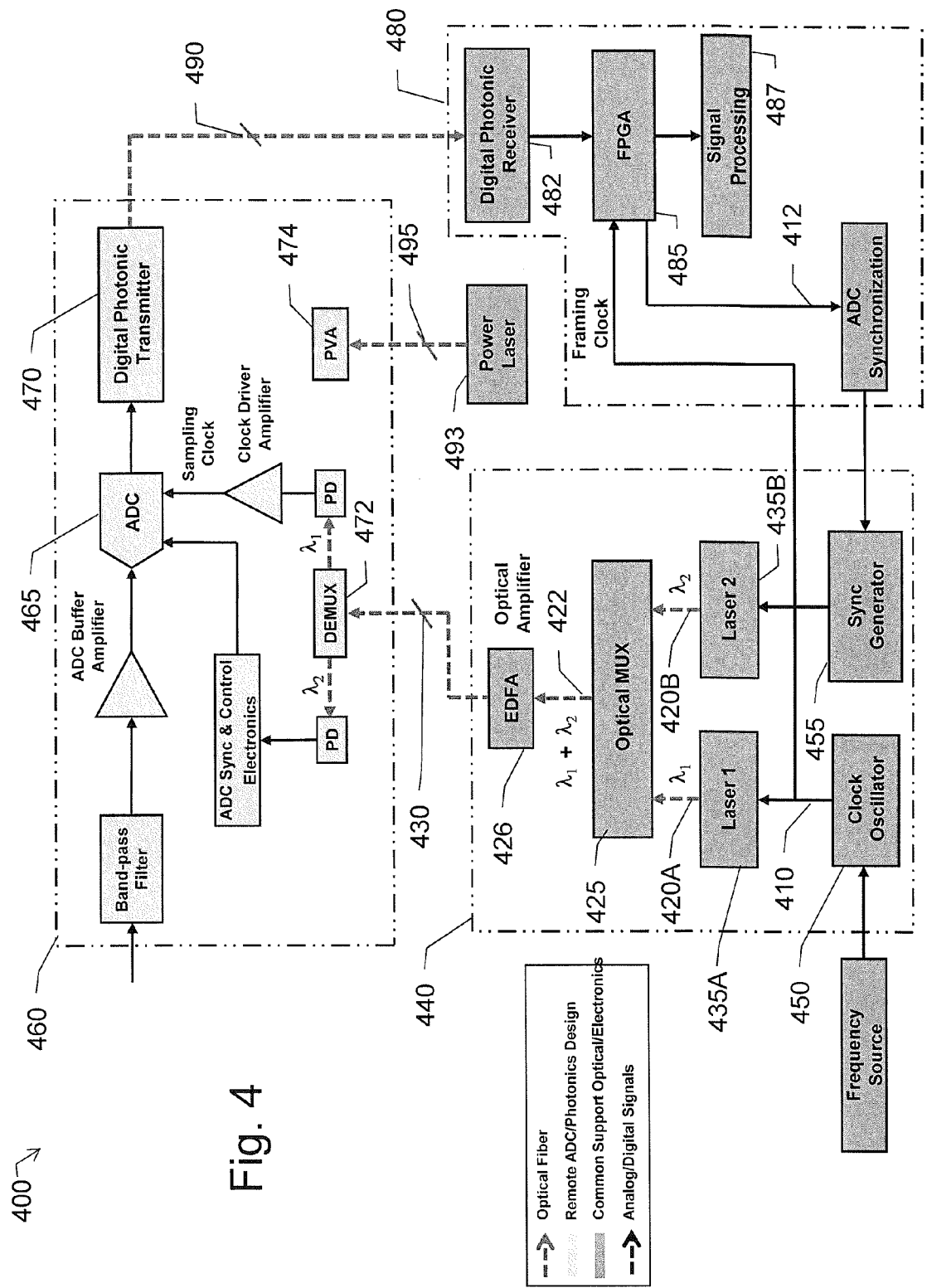
FIG. 4 is a high level block diagram of a representative architecture for a remote sensor system, according to one embodiment of the present invention.

Alternatively, as illustrated in FIG. 4, an ADC sampling clock 410 and a JESD204 sync signal 412 may be combined and distributed to the remote ADC via a single, separate photonic link 430 using an optical wavelength division multiplexing (WDM) technique. (As noted above, and without limitation, photonic WDM link 430 may form a part of optical connection 315.)

In one exemplary embodiment of a WDM link 430, two different optical laser wavelengths (or colors) 420A, 420B operating in, for example but not by way of limitation, the 1550 nm C-band range (typically using 20 nm spacing) may be optically multiplexed onto a single fiber 422 and amplified using an erbium doped fiber amplifier (EDFA) 426. Each laser wavelength 420A, 420B (also referred to as lambda 1 or lambda 2) may then be employed as a separate optical carrier that is intensity modulated (using either direct or external modulation techniques) before multiplexing with the respective sampling clock and ADC sync signal. The design, configuration, and use of standard WDM techniques to distribute these types of clock and sync signals is well within the skill of one of ordinary skill in the art and does not require undue experimentation. Accordingly, further discussion is omitted.

The balance of FIG. 4 depicts additional details of one exemplary embodiment of a remote sensor system 400. Here, remote receiver 460 includes, inter alia, ADC 465 and photonic transmitter 470. Demultiplexer 472 receives WDM link 430 and recovers the ADC sync and the sampling clock signals.

The main processor functions are performed by processor module 480, which may include photonic receiver 482, JESD204 receiver 485 (which may be, as noted above, implemented in various forms of interface circuitry, such as but not limited to the FPGA as shown), and additional (mission-related) signal processing functions 487. Digitized ADC data is transferred from photonic transmitter 470 to phonic receiver (interface circuitry) 482 by optical data link 490. Photonic interface circuitry 482 may, in some embodiments, provide only the processing necessary to recover the digitized sensor data from ADC 465. In alternate embodiments, interface circuitry 482 may fully process the digitized data into mission-dependant sensor information.

Power-by-light (PBL) electrical power, discussed above, may be supplied to remote receiver 460 by power laser 493 and PBL link 495. Photovoltaic assembly (PVA) 474 converts the optical energy to dc power for use in remote receiver 460. Power laser 193 may be located apart from remote receiver 460, processor module 480, and/or photonic distribution module 440. Alternatively, power laser 493 may be co-located with or located near processor module 480 and/or photonic distribution module 440.

As described above, photonic distribution module 440 may include wavelength-division optical multiplexer (WDM) 425, optical amplifier 426 (as, for example and not by way of limitation, an EDFA), and lasers 435A and 435B. In addition, photonic distribution module 440 may also include, inter alia, sampling/framing clock oscillator 450 and JESD204 sync generator 455.

In this exemplary embodiment, a total of three fiber optic links are used. WDM link 430, PBL link 495, and data link 490 may each be, in some embodiments, a single-mode optical fiber. Alternatively, a multi-mode optical fiber may also be employed in any or all of these links. In one exemplary embodiment, WDM link 430 and data link 490 are each carried on a single-mode fiber and PBL link 495 is carried on a multi-mode fiber.

In an alternate embodiment, JESD204 sync signal 412 may be transferred to remote receiver 460 by means of data link 490, rather than on WDM link 430. Data link 490 may then be implemented as a bi-directional link. In such an embodiment, as noted above, photonic transmitter 470 and photonic receiver 480 would be replaced by conventional photonic transceivers (not shown). Photonic distribution module 440 may then be simplified to eliminate WDM 425 and laser 435B. The functionality of sync generator 455, if not the circuitry itself, would then reside within processor module 480.

In a further alternate embodiment, some or all of the functionality of photonic distribution module 440 and processor module 480 may be combined in a single module of any level of integration commonly employed by those of ordinary skill in the relevant arts. In a still further embodiment, while data link 490 is operated bi-directionally and carries sync signal 412, two or more lasers 435 and an appropriately configured WDM 425 may be used to convey multiple sync and/or clock signals, or other control signals, "upstream" to remote receiver 460.

Also, although an EDFA is described as providing the optical amplification function 425 in FIG. 4, those skilled in the art will realize that optical amplifiers other than an EDFA can be used. Accordingly, the concepts, systems, and techniques described herein are not limited to any particular type of optical amplifier.

Thus, by utilizing analog-to-digital converters with the JESD204 serial interface one can, for the first time, implement an entire long distance remote sensor system connected entirely by a small, limited number of photonic links. Electrical power may be delivered to the remote sensor ADC using power-by-light technology. Optical wavelength division multiplexing may be used to provide multiple ADC sampling clock, synchronization, and/or control signals over a separate optical fiber. The sampled data from the serial output ADC may them be transmitted over another optical fiber and thus routed to a distant, centralized processor for collection and analysis. In addition, the signals on some or all of these fibers may be multiplexed onto a single fiber through WDM or other techniques well known in the art. The resulting all-optical-fiber connection between the remote sensor and the processor is not only lightweight and immune to EMI, it can be more readily implemented in size- and power-constrained applications.

Figure 5:
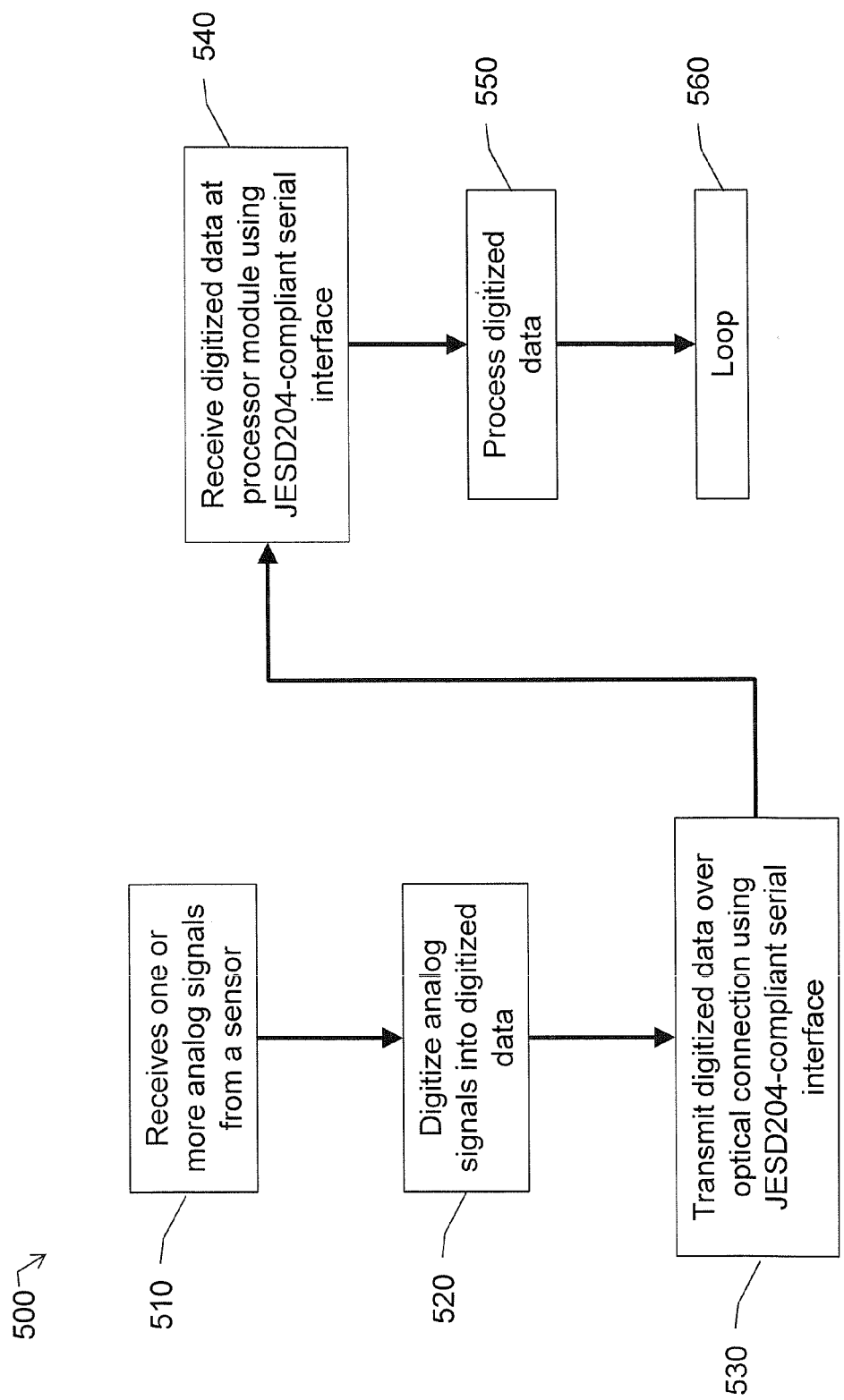
FIG. 5 is a flowchart of a method of using a digital photonic link in a remote sensor system, according to one embodiment of the present invention.

FIG. 5 is a flowchart of a method of using a digital photonic link in a remote sensor system, according to one embodiment of the concepts, systems, and techniques disclosed herein.

The process of remote sensor communications may thus comprise at least the following steps. First, in step 510, the system of receives one or more analog signals from a sensor disposed at a location that is remote from a base station to which the analog signals are provided. The one or more analog signals are digitized, step 520, in the remote receiver to form a digitized data stream. Next, the digitized data stream is transmitted over an optical connection, step 530, to a processor module located apart from the remote receiver.

The processor module receives the digitized data in step 540 and processes it as necessary and desired in step 550. As discussed above, at least the steps of transmitting 530 and receiving 540 may employ a JESD204-compliant serial interface.

Process 500 loops indefinitely, at least until all analog sensor data is digitized, transmitted, received, and processed.

The order in which the steps of the present method are performed is purely illustrative in nature. In fact, the steps can be performed in any order or in parallel, unless otherwise indicated by the present disclosure.

The concepts, systems, and techniques of the present disclosure may be performed in either hardware, software, or any combination thereof, as those terms are currently known in the art. In particular, the present method may be carried out at least in part by software, firmware, and/or microcode operating on a computer or computers of any type. Additionally, software embodying the present invention may comprise computer instructions in any form (e.g., source code, object code, and/or interpreted code, etc.) stored in any computer-readable medium (e.g., ROM, RAM, magnetic media, punched tape or card, compact disc (CD), digital versatile disc (DVD), and/or solid state disc (SSD), etc.). Furthermore, such software may also be in the form of a computer data signal embodied in a carrier wave, such as that found within the well-known Web pages transferred among devices connected to and with computer networks, such as the Internet. Accordingly, the present invention is not limited to any particular platform, unless specifically stated otherwise in the present disclosure.

While particular embodiments of the present invention have been shown and described, it will be apparent to those skilled in the art that various changes and modifications in form and details may be made therein without departing from the spirit and scope of the invention as defined by the following claims. Accordingly, the appended claims encompass within their scope all such changes and modifications.

We claim:

1. An apparatus for remote sensor communications, comprising:
    an optical connection having a length greater than about one meter;
    a remote receiver operably connected to a first end of said optical connection, said remote receiver comprising:
    a photovoltaic assembly (PVA) for providing electrical power for use by the remote receiver in response to optical energy provided thereto;
    a remote sensor; and
    an analog-to-digital converter (ADC) located in proximity to said remote sensor and comprising a JESD204-compliant serial transmitter element, said ADC operably connected to said remote sensor and receiving analog data therefrom, said ADC configured to digitize and serialize said analog data; and to transmit said serialized digitized data over said optical connection through a JESD204-complaint serial interface, wherein the analog data is serialized through the JESD204-compliant serial transmitter element of the ADC;
    a processor module operably connected to a second end of said optical connection, said processor module comprising:
    interface circuitry comprising a JESD204-compliant receiver element, said interface circuitry configured to receive said serialized digitized data from said optical connection and recover digitized data from said serialized digitized data; and
    a processor operably connected to said interface circuitry and configured to receive and process said digitized data; and
    a power-by-light (PBL) module operably coupled to said PVA, said PBL module comprising:
    a laser spaced apart from said remote receiver and said processor module, wherein said laser provides optical energy to said PVA;
    wherein at least a portion of said optical connection employs wavelength division multiplexing to transmit at least a sync signal and clock signal to said ADC from said processor.

2. The apparatus of claim 1, wherein at least a portion of said optical connection employs a bi-directional link to transmit at least a sync signal from said processor to said ADC while receiving said digitized data from said remote receiver.

3. The apparatus of claim 1, wherein said optical connection comprises a plurality of optical fibers.

4. The apparatus of claim 3, wherein a first one of said plurality of optical fibers carries said optical connection and a second one of said plurality of optical fibers carries a link to the PBL module.

5. The apparatus of claim 3, wherein a first one of said plurality of optical fibers carries said optical connection and a second one of said plurality of optical fibers transmits a wavelength division multiplexed link comprising at least a clock signal to said ADC from said processor.

6. The apparatus of claim 1, wherein said JESD204-compliant serial interface employs 8B/10B encoding.

7. The apparatus of claim 1, wherein said JESD204-compliant serial interface employs scrambling.

8. A method of remote sensor communications, comprising:
    receiving one or more analog signals at a remote receiver operably connected to a first end of an optical connection having a length greater than about one meter, said remote receiver comprising a photovoltaic assembly (PVA) for providing electrical power for use by the remote receiver in response to optical energy provided thereto;
    digitizing and serializing said one or more analog signals in said remote receiver to form serialized digitized data, wherein the analog signals are serialized through a JESD204-compliant serial transmitter element;
    transmitting said serialized digitized data over said optical connection through a JESD204-complaint serial interface to a processor module operably connected to a second end of said optical connection, said processor module comprising a JESD204-compliant receiver element;
    receiving said serialized digitized data in said processor module and recovering digitized data from said serialized digitized data;
    processing said digitized data in said processor module, and
    providing optical energy to said PVA through a power-by-light (PBL) module operably coupled to said PVA, said PBL module comprising a laser spaced apart from said remote receiver for providing said optical energy;

wherein at least a portion of said optical connection employs wavelength division multiplexing to transmit at least a sync signal and clock signal to said remote receiver from said processor module.

9. The method of claim 8, wherein said transmitting employs a bi-directional link from said processor to said remote receiver.

10. The method of claim 8, wherein said transmitting employs a plurality of optical fibers.

11. The method of claim 10, wherein a first one of said plurality of optical fibers carries said optical connection and a second one of said plurality of optical fibers carries a link to the PBL module.

12. The method of claim 10, wherein a first one of said plurality of optical fibers carries said optical connection and a second one of said plurality of optical fibers transmits a wavelength division multiplexed link comprising at least a clock signal to said ADC from said processor.

13. The method of claim 8, wherein said JESD204-compliant serial interface employs 8B/10B encoding.

14. The method of claim 8, wherein said JESD204-compliant serial interface employs scrambling.

15. An apparatus for remote sensor communications, comprising:
    means for receiving one or more analog signals at a remote receiver operably connected to a first end of an optical connection having a length greater than about one meter, said remote receiver comprising a photovoltaic assembly (PVA) for providing electrical power for use by the remote receiver in response to optical energy provided thereto;
    means for digitizing and serializing said one or more analog signals in said remote receiver to form serialized digitized data, wherein said means for serializing said analog signals comprises serializing said analog signals through a JESD204-compliant serial transmitter element;
    means for transmitting said serialized digitized data over said optical connection through a JESD204-complaint serial interface to a processor module operably connected to a second end of said optical connection;
    means for receiving said serialized digitized data in said processor module wherein said means for receiving comprises a JESD204-complaint serial receiver element;
    means for processing said digitized data in said processor module; and
    means for providing optical energy to said PVA wherein said means comprises providing said optical energy to said PVA through a power-by-light (PBL) module operably coupled to said PVA, said PBL module comprising a laser spaced apart from said remote receiver for providing said optical energy;
    wherein at least a portion of said optical connection employs wavelength division multiplexing to transmit at least a sync signal and clock signal to said remote receiver from said processor module.

16. The apparatus of claim 1, wherein the remote receiver further comprises photonic driver circuitry coupled to an output of the ADC and configured to support a transmission rate set by a sampling clock of the ADC, said photonic driver circuitry transmitting said serialized digitized data over said optical connection.

* * * * *